United States Patent
Lin et al.

(10) Patent No.: US 12,347,150 B2
(45) Date of Patent: Jul. 1, 2025

(54) SYSTEM AND METHOD FOR SCENE GRAPH LOSSLESS COMPRESSION BY CONTEXT-BASED GRAPH CONVOLUTION

(71) Applicant: SHANGHAI JIAO TONG UNIVERSITY, Shanghai (CN)

(72) Inventors: Weiyao Lin, Shanghai (CN); Yufeng Zhang, Shanghai (CN); Huabin Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 433 days.

(21) Appl. No.: 18/052,418

(22) Filed: Nov. 3, 2022

(65) Prior Publication Data
US 2023/0154053 A1 May 18, 2023

(51) Int. Cl.
G06T 9/00 (2006.01)
G06N 3/08 (2023.01)
G06N 3/088 (2023.01)
G06N 7/01 (2023.01)
G06N 7/04 (2006.01)

(52) U.S. Cl.
CPC ............ G06T 9/002 (2013.01); G06N 3/088 (2013.01)

(58) Field of Classification Search
USPC .... 358/1.11–1.18, 1.1–3.28, 426.01–426.14; 382/232–253, 286–308, 155–158; 704/258–275, 500–504; 706/1–21
See application file for complete search history.

(56) References Cited

PUBLICATIONS

Zhang, Li-zong;A Scene Graph Generating Method Based on Context Graph Attention Mechanism; 2021 (Year: 2021).*
Lin Ke; Method, Apparatus, Device and Medium for Generating Captioning Information of Multimedia Data; 2020 (Year: 2020).*
Zhang, Bin; End-to-end Multi-mode Question Answering Method And System Based on Multi-interaction Attention; 2021 (Year: 2021).*
Ren, Tong-wei; A Video Depth Relation Analysis Method Based on Multi-mode Feature Fusion; 2021 (Year: 2021).*

* cited by examiner

*Primary Examiner* — Marcellus J Augustin
(74) *Attorney, Agent, or Firm* — CBM PATENT CONSULTING, LLC

(57) ABSTRACT

A system and method for scene graph lossless compression based on context-based graph convolution comprises a prior encoding module, a first prior decoding module, a data encoding module located at the compressor side, a second prior decoding module, and a data decoding module located at the decompressor side; it extracts prior information from the original scene graph; for different data elements such as object location, object category, interaction relationship, and relation category, it applies different random distribution models with context-based graph convolutional neural networks to estimate the respective prior probabilities for arithmetic encoding and decoding; therefore, it can effectively exploit the contextual information within the scene graph data to perform more accurate probability prediction and thus achieve a better compression ratio.

9 Claims, 7 Drawing Sheets

SYSTEM AND METHOD FOR SCENE GRAPH LOSSLESS COMPRESSION BY CONTEXT-BASED GRAPH CONVOLUTION

CROSS REFERENCES

This application claims priority to Chinese Patent Application Ser. No. CN202111353611.0 filed on 16 Nov. 2021.

TECHNICAL FIELD

The present invention relates to a technique in data compression, specifically a system and method for lossless compression of scene graph data based on contextual graph convolution.

BACKGROUND TECHNOLOGY

The scene graph is a collection of data about objects in an image and data about the relationships between objects. Such data is usually composed of multiple data elements, such as object location, object category, interaction relationship, and relationship category, which can be represented with a graph structure, as shown in FIG. 1.

In recent years, the task of scene graph generation for images has been widely applied and attracted much attention. Meanwhile, how to compress such graph-structured data, which contains continuously distributed data elements (e.g., object location) and discrete distributed data elements (e.g., object category and relationship), has become an outstanding issue. Commonly used image and video compression methods (e.g., JPEG, MPEG-2) can only handle continuously distributed two-dimensional or three-dimensional data. In contrast, algorithms used for graph compression (e.g., WebGraph, K-squared tree) can only tackle discrete graph structure data, such as the adjacency list or adjacency matrix of a graph. More importantly, in the scene graph, different data elements are strongly correlated with each other. For example, the relationship "person riding a bicycle" implies that the location of "person" is likely to be above the location of "bicycle." However, existing general-purpose data compressors (e.g., gzip, lzma) directly compress the binary data stream while ignoring such potential correlation, resulting in a low compression ratio.

In summary, there lacks a unified and efficient compression method to deal with the scene graph data.

SUMMARY OF THE INVENTION

To address the above deficiencies, the invention devises a lossless scene graph compression system based on context-based graph convolution. The present invention extracts prior information from the original scene graph. It applies different prediction models with context-based graph convolutional neural networks to estimate prior probabilities for lossless arithmetic encoding and decoding for object location, object category, interaction relationship, and relationship category data. The context-based graph convolutional neural network can effectively exploit contextual information in the scene graph data to obtain more accurate probability predictions and thus achieve a higher compression ratio.

The present invention is realized by the following technical solutions.

The present invention is a lossless scene graph compression system based on context-based graph convolution. It comprises a prior encoding module, a first prior decoding module, a data encoding module on the compressor side, a second prior decoding module, and a data decoding module on the decompressor side. Specifically, the prior encoding module extracts the compressed prior stream from the scene graph data, and the first prior decoding module obtains prior information based on the prior stream. Based on the prior information and the contextual information extracted from the scene graph, the data encoding module encodes the object location, object category, interaction relationship, and relationship category to obtain the data stream. The data stream and the prior stream can be regarded as a lossless compressed representation of the data and then sent together to be decompressed on the decompressor side. The second prior decoding module obtains prior information from the prior stream. The data decoding module decodes the data stream and continuously updates the decoded data based on prior and contextual information. Finally, it obtains the complete decoded data as the output of lossless decompression.

The present invention includes a method for lossless compression of scene graph data based on the above system. It applies different implementations of the data encoding and decoding modules for distinctive data elements in the scene graph. Regarding the object location data, the system uses a context-based graph convolutional network to extract contextual information from object location data, then uses a fusion network to combine the prior information to estimate the parameters of a generalized random distribution model. Regarding the interaction relationships, aka the graph structure, it applies the directed graph context autoencoder to combine the contextual information from the graph structure in the form of an adjacency matrix with the prior information to estimate the parameters of a binomial discrete probability distribution model. For the relationship categories, the system utilizes the directed graph context autoencoder to estimate the parameters of a multinomial discrete probability distribution model. Specifically, the number of terms equals the number of relationship categories in the dataset. For the object categories, the system applies the context-based graph convolutional network and the fusion network to generate parameters of a multinomial discrete probability distribution model. Similarly, the number of terms equals the number of relationship categories in the dataset. Finally, the prior probabilities are obtained from all distribution models and are utilized to compress scene graph data losslessly with arithmetic coding to produce the final compression result.

The so-called generalized random distribution model refers to a random distribution model defined as a neural network, which resembles a cumulative distribution function that satisfies a value domain of [0,1] and is monotonically non-decreasing. The neural network parameters are obtained from the output of the fusion network rather than updated during network training. Using such a model can better fit the distribution of object locations under complicated constraints from interaction relationships. Traditional random distribution models, such as Gaussian and Laplace distribution, cannot fit well in complex distribution situations. For example, suppose the interaction between the subject and the object is known to be ride. In that case, the object's position is underneath the subject. That is to say, its coordinates on the y-axis should be a one-sided distribution, in which case applying the symmetric distribution models such as Gaussian distribution or Laplace distribution is unsuitable. The implementation of this model refers to the "Univariate non-parametric density model" introduced in Johannes Ballé, David Minnen, Saurabh Singh, Sung Jin Hwang, Nick Johnston: Variational image compression with a scale hyperprior. ICLR (Poster) 2018.

The so-called context-based graph convolution is an improved graph convolution operation in which the latter nodes are prevented from passing messages to the former. This way, it can ensure the contextual information are identical on both the encoder and decoder sides. From the perspective of the graph adjacency matrix, the process can be simplified as setting the lower triangle part of the input adjacency matrix in the graph convolution to 0, expressed as $$Z = D^{-\frac{1}{2}} triu(A) D^{-\frac{1}{2}} X\Theta,$$

where X is the input feature, Z is the output feature, $\Theta$ is the network parameter, triu(A) is the upper triangular part of the adjacency matrix, and D is the degree matrix of the upper triangular part of the adjacency matrix.

The "graph convolution" described above refers to the algorithm proposed by Kipf et al. in Semi-Supervised Classification with Graph Convolutional Networks, capable of extracting graph features. To exploit the information of the relationship category, the system implements graph convolution using the relational graph convolution (R-GCN) algorithm proposed by Schlichtkrull et al. in Modeling Relational Data with Graph Convolutional Networks.

The so-called directed graph context autoencoder denotes a combination of graph autoencoder and context-based graph convolution. This module encodes the interaction relationship between the decoded nodes using the context-based graph convolution. Then, the encoded result is decoded by dot product with the prior information to estimate the interaction probability from the former nodes to the current node in the form of an adjacency matrix. In contrast, when calculating the interaction probability of the current node to former nodes, the context-based graph convolution ignores such message-passing flows. Therefore, the contextual information of the decoded nodes cannot be used, and the prior probability can only be calculated from prior information.

The graph autoencoder refers to: an algorithm that is able to compress the graph structure into a low-dimensional representation, as proposed by Kipf et al. in Variational Graph Auto-Encoders.

Technical Effect

Compared with the prior art or a simple combination of multiple dedicated compression methods, the present invention enables end-to-end learned scene graph data compression and decompression with lower system complexity. The present invention makes better use of the correlation between different data elements of scene graph data and ensures more accurate prior probability estimation by designing different context models, thus achieving a higher compression ratio.

DETAILED DESCRIPTION OF THE INVENTION

The presented implementation involves a training and testing process of a context-based graph convolutional lossless compression method for scene graphs. It uses the publicly available dataset VisualGenome, in which the most frequent 1000 classes of objects and 500 classes of interaction relationships are selected, and the filtered dataset is divided into a training set and a test set in the ratio of 8:2.

Figure 1:
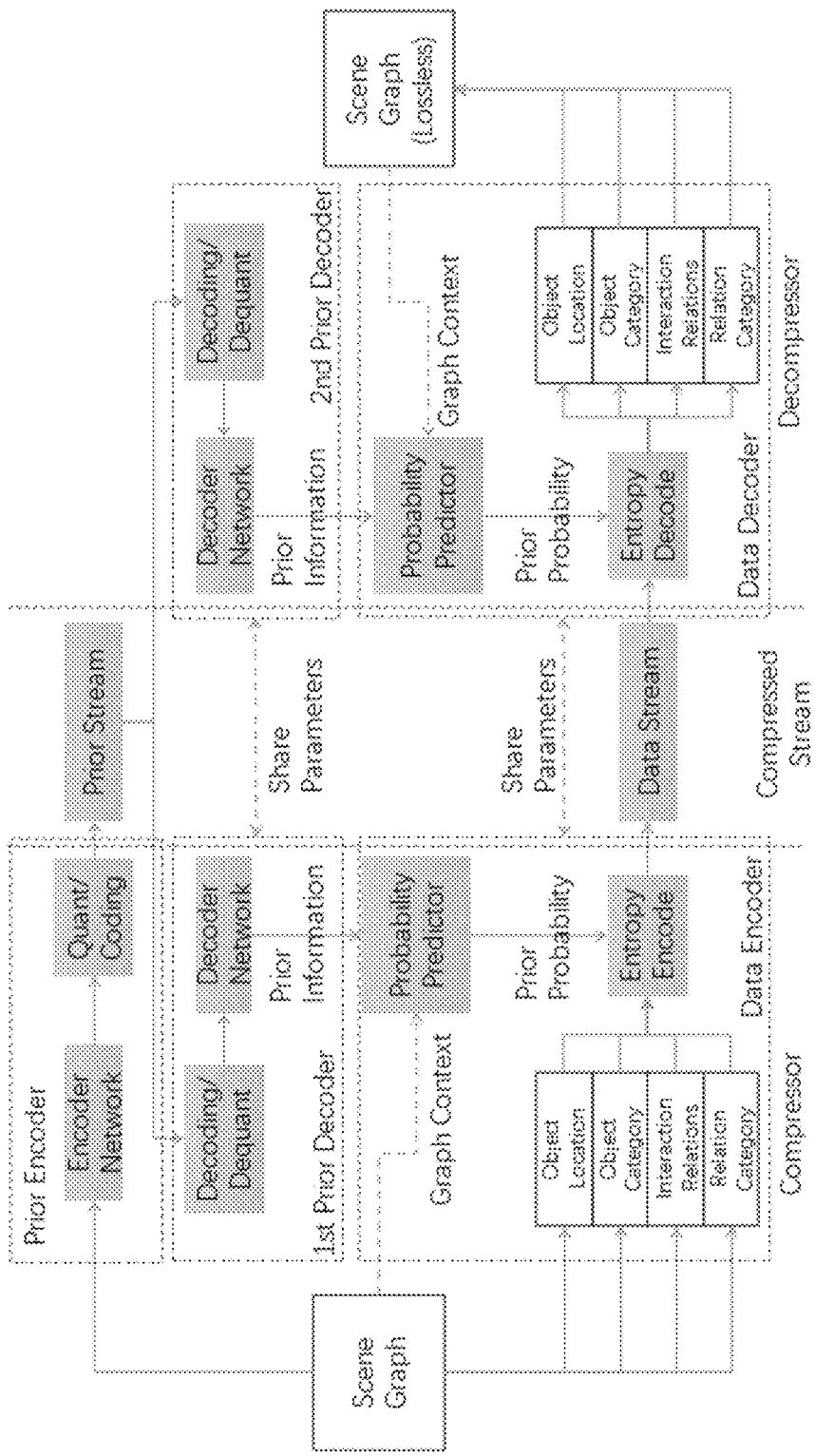
FIG. 1 is a schematic diagram of the system of the present invention.

As shown in FIG. 1, it's a context-based graph convolutional lossless compression system for scene graph data. It comprises a prior encoding module, a first prior decoding module, a data encoding module located at the compressor side, a second prior decoding module, and a data decoding module located at the decompressor side. The presented implementation could losslessly compress object location, object category, interaction relationship, and relation category within scene graph data.

Figure 2:
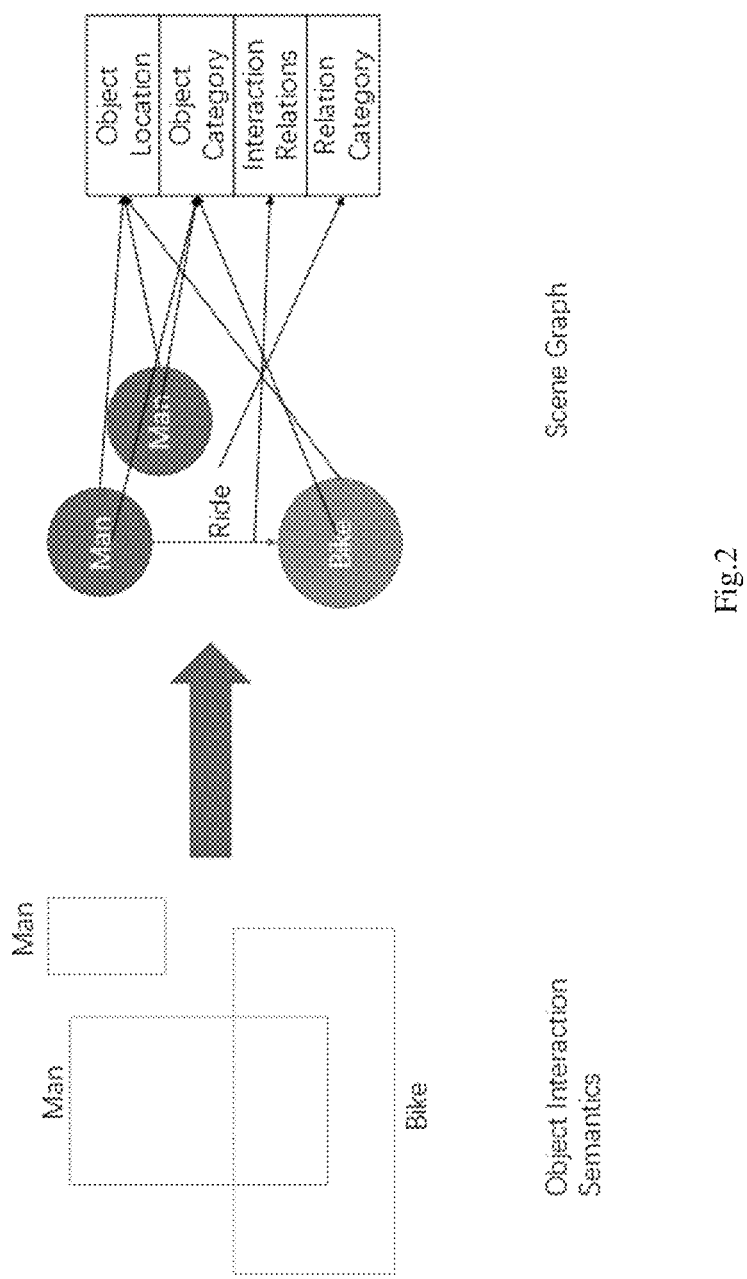
FIG. 2 is a schematic diagram of the visualization of the scene graph data.

As shown in FIG. 2, the so-called object location refers to the pixel coordinate of the object in the image on the x-axis and y-axis, represented by four coordinate values defining a box on the image. The so-called object category refers to the semantic category label of the object in the image, represented by an enumeration noun. The interaction relationship denotes a relationship between two objects in the image, represented by an N*N adjacency matrix for N objects. The so-called relation category refers to the category label of the relation between objects in the image, represented by an enumeration verb or orientation preposition.

The prior encoding module includes an encoding network as well as quantization and coding modules. The encoding network extracts an embedding vector of 2 channels from the scene graph data for later probability prediction. The quantization and coding module rounds the prior information and then uses an entropy encoder to encode the rounded values into a prior stream.

The first and second prior information decoding modules contain a decoding and dequantization module and a decoding network. The decoding and dequantization model decodes the prior stream with an entropy decoder and converts the decoded integer data into floating-point data. The decoding network transforms the floating-point data to obtain prior information of the original scene graph and decomposes it into prior information for object location, object category, interaction relationship, and relation category.

The encoding network and the decoding network both comprise a fully-connected neural network with four fully-connected layers and ReLU layers.

The data encoding module includes a first probability predictor and an entropy encoding module. Based on the prior information (output of the prior decoding module) and the context information (from the original data), the first probability predictor performs fusion and transformation operations and outputs a prior probability of the data to be encoded. According to the predicted prior probability, the entropy encoding module can perform entropy data coding and outputs a compressed data stream.

The data decoding module includes a second probability predictor and an entropy decoding module. The second probability predictor shares parameters with the first probability predictor and performs the same fusion and transformation processing, and outputs the same prior probability of the data to be decoded based on the same prior information and context information from the decoded data. The entropy decoding module performs entropy decoding and outputs each data after lossless decoding based on the input data stream and the prior probability.

In the training stage, the probability predictor uses the existing scene graph data and calculates the information entropy as the loss function. By decreasing the value of the loss function, the whole system is encouraged to reduce the length of the compressed bitstream so that the accuracy of the probability prediction can be automatically optimized. Specifically:

$$\mathcal{L} = \frac{\sum_x \log_2 p(x)}{N},$$

where x is the data to be compressed, p(x) is the prior probability of x output by the probability predictor, and N is the normalizing value, which can denote the number of nodes in a scene graph.

The so-called prior probability is the probability of the occurrence of an event predicted from previous experience. According to Shannon's information entropy theory, the limit of the lossless compression rate of information is related to the uncertainty of information. The more accurate the probability prediction of the information, the lower the lossless compression rate of the information and the better the compression effect. Therefore, in a lossless compression system, the prior probability needs to be estimated as accurately as possible to achieve the best compression rate.

Figure 3:
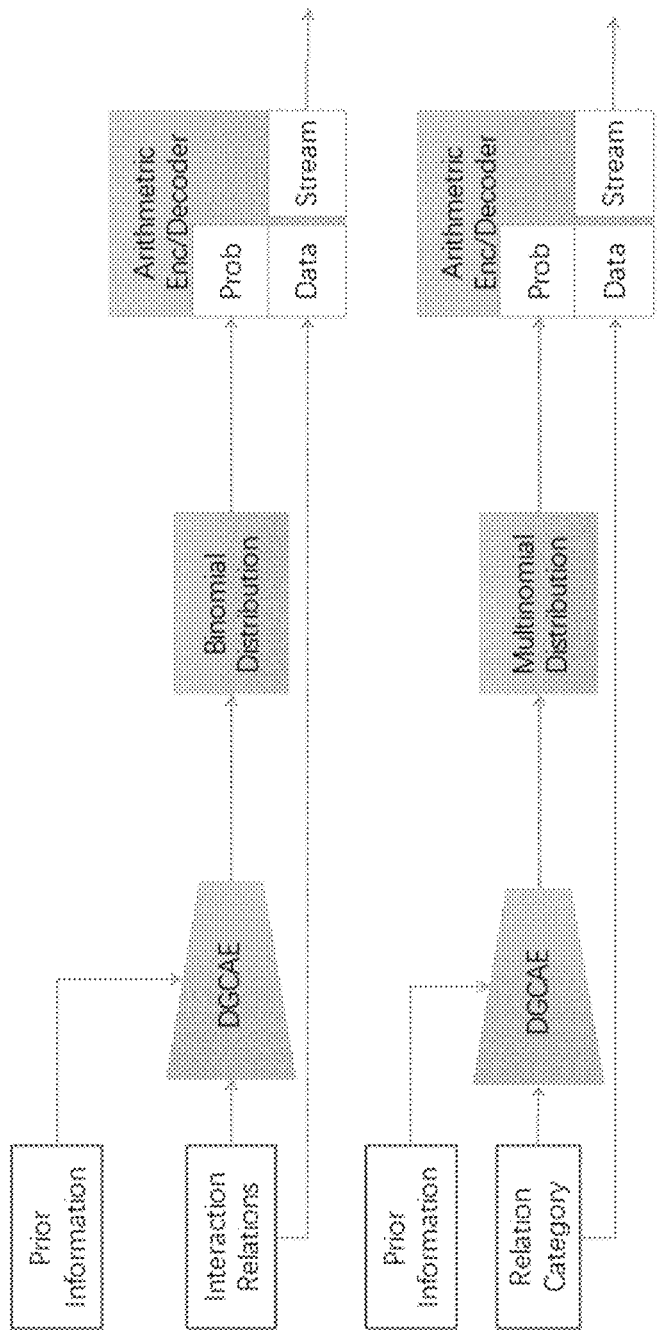
FIG. 3 is a schematic diagram of the interaction relationship and relationship category portion of the probability predictor in the data encoding and decoding module.
Figure 4:
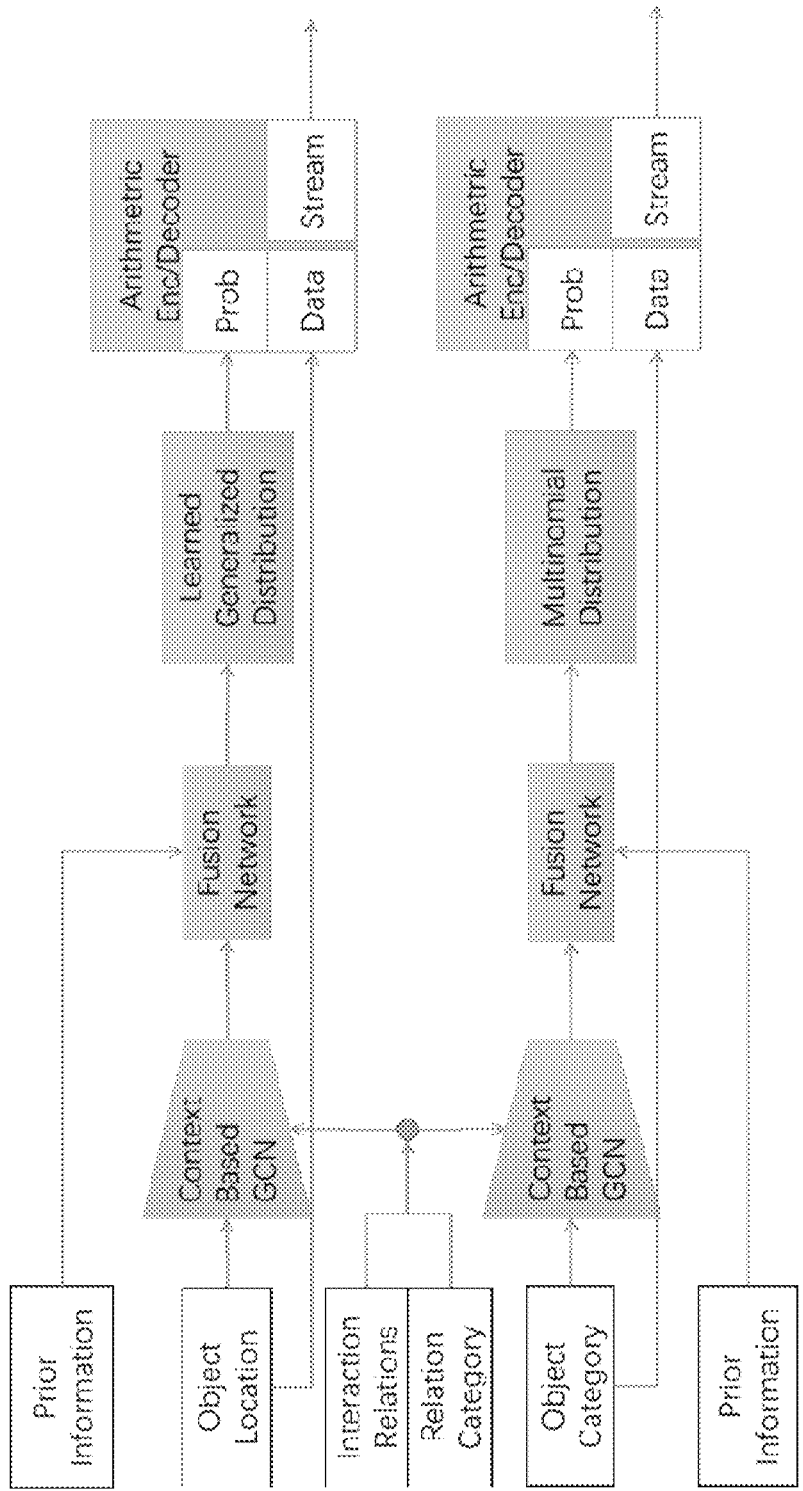
FIG. 4 is a schematic diagram of the object location and object category portion of the probability predictor in the data encoding and decoding module.
Figure 5:
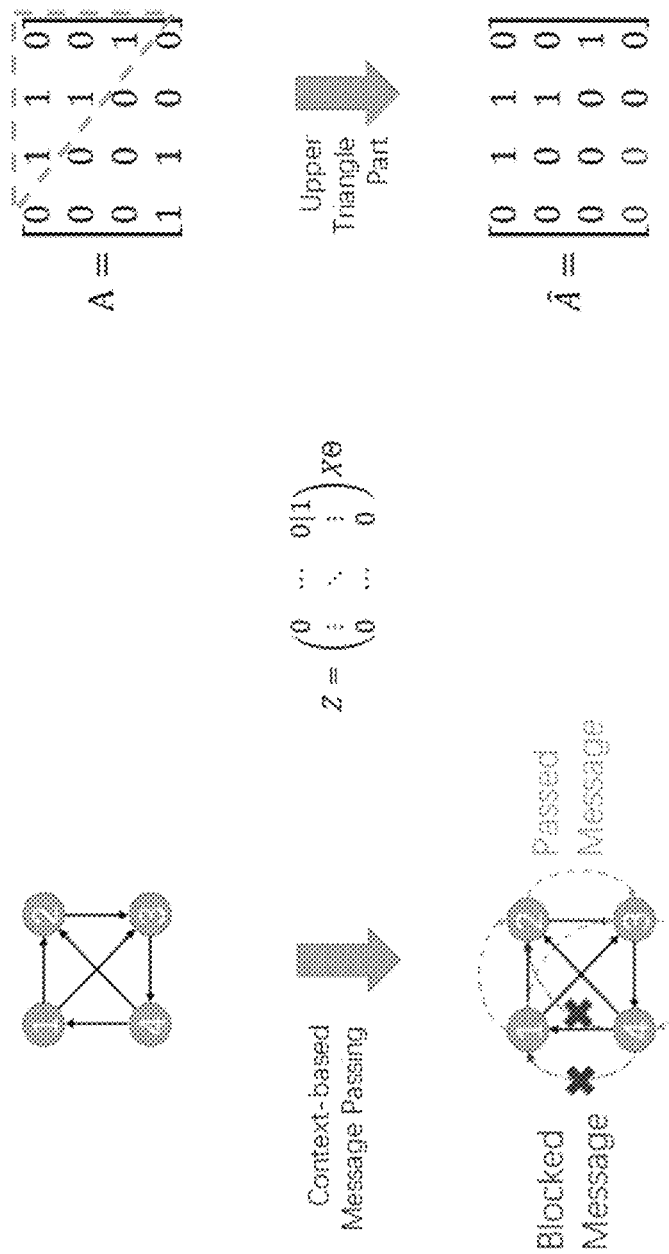
FIG. 5 is a schematic diagram of the principle and implementation of context-based graph convolution.
Figure 6:
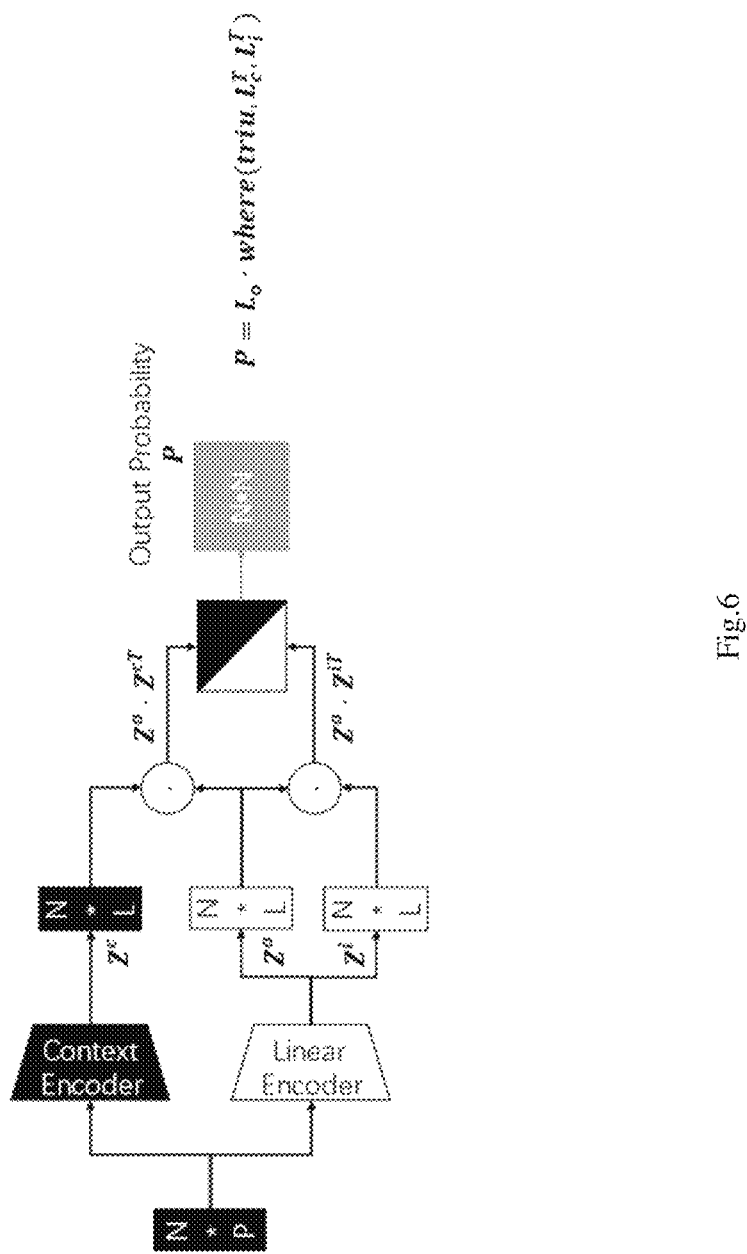
FIG. 6 is a schematic diagram of the model structure of a directed graph context autoencoder.

As shown in FIG. 3 and FIG. 4, the probability predictors may include a fusion network, a context-based graph convolutional network, and a directed graph context auto-encoder.

The fusion network includes a channel concatenating layer, a three-layer fully-connected neural network with three fully-connected layers, and two ReLU layers. The channel concatenating layer concatenates the prior information with the graph contextual information extracted from the context-based graph convolutional network. It performs feature transformation through the fully-connected neural network.

The context-based graph convolutional network includes a context-based graph convolutional layer followed by two ReLU layers and fully-connected layers. The context-based graph convolutional layer extracts the graph context information, and the following fully-connected network performs feature transformation.

The directed graph contextual auto-encoder combines context-based graph convolution with graph auto-encoder, effectively utilizing the interaction between decoded objects. The directed graph contextual auto-encoder includes a transform network and context network. Specifically, the transform network includes a four-layer fully-connected neural network with three ReLU layers. The context-based graph convolutional network includes a context-based graph convolutional layer followed by two ReLU and fully-connected layers. This module performs context feature extraction through the context-based graph convolutional layer and feature transformation through the fully-connected network.

Figure 7:
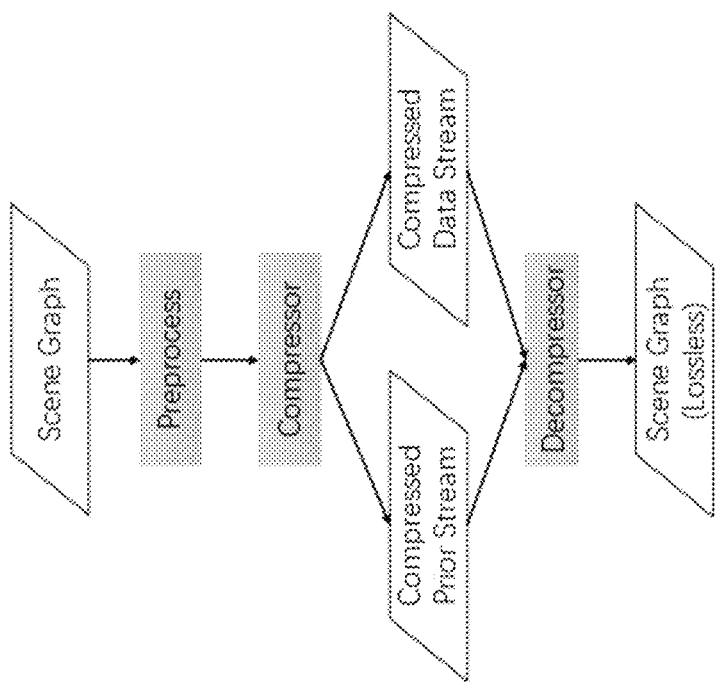
FIG. 7 is a flowchart of the procedure of applying the present invention to scene graph coding.

As shown in FIG. 7, in this implementation, the scene graph lossless compression method in the system is based on the context-based graph convolution, in which the input scene graph is preprocessed, where the parts that do not need to be compressed are discarded. Some non-integer data are pre-quantized for subsequent compression. In the compression stage, the prior and data streams are obtained by compressing the scene graph data after data preprocessing. In the decompression stage, the scene graph is decoded according to the prior stream and data stream; since it's lossless compression, the decompressed graph should be the same as the graph output by the data preprocessing module.

In this implementation, the software implementation of the whole framework is based on the open-source software PyTorch and pytorch_geometric.

The built framework is trained on the training set described above. The network parameters are randomly initialized at the beginning, and then 100 epochs of network training cycles are performed. The initial learning rate is 0.001, and if the compression rate does not decrease for 10 consecutive cycles, the learning rate decreases to one-tenth of the previous learning rate.

The trained framework is then tested on the test set described above, and the compression ratio is calculated.

The described test results are compared with similar methods, as shown in the table, the compression rate of this method is lower for the scene graph data, and the compression rate is reduced by nearly 40% compared with the general-purpose compression algorithm zlib, which has better compression effect.

| Method | Object location | Object category | Interaction relationship | Relationship category | Total compression rate* |
|---|---|---|---|---|---|
| Zlib | 45.2% | 24.7% | 22.9% | 21.2% | 28.4% |
| Ours w/o context | 21.6% | 11.5% | 9.3% | 10.5% | 17.3% |
| Ours with context | 21.4% | 10.3% | 9.2% | 10.5% | 16.9% |

*The total compression ratio includes the prior stream and some other additional data in the dataset, such as the width and height of the image, and thus will be somewhat higher.

Compared to existing general-purpose compression methods, the present invention has a higher compression rate for scene graph data, which is nearly 40% higher compared to the zlib algorithm. This is because the generic data compression methods can only reduce data redundancy with neighboring symbols in the binary stream and cannot utilize the semantic information of the graph. In contrast, the present invention extracts prior knowledge through neural networks and designs context-based graph convolutional neural networks to process graph contextual information, thus enabling better prediction of probabilities and achieving higher compression rates.

Compared to the mixture of dedicated compression methods (such as graph structure compression), the present method has lower system complexity and can process all data of the semantic information of the scene graph with an end-to-end neural network-based system. In addition, the present invention could be extended to compress other similar scene graph data elements, such as object certainty or relation certainty, by adding the corresponding probability predictors.

The above specific embodiments may be adapted in different ways by a person skilled in the art without departing from the principles and purposes of the present invention. The scope of protection of the present invention is governed by the claims and is not limited by the above specific embodiments. Each embodiment within its scope is subject to the present invention.

What is claimed is:

1. A context-based graph convolutional lossless compression system for scene graph data, comprising a computer readable medium operable on a computer with memory for programs of calculations which comprises: a prior encoding module, a first prior decoding module, a data encoding module on the compressor side, a second prior decoding module, and a data decoding module on the decompressor side, and specifically, the prior encoding module extracts the compressed prior stream from the scene graph data, and the first prior decoding module obtains prior information based on the prior stream;

based on the prior information and the contextual information extracted from the scene graph, the data encoding module encodes the object location, object category, interaction relationship, and relationship category to obtain the data stream, and the data stream and the prior stream can be regarded as a lossless compressed representation of the data and then sent together to be decompressed on the decompressor side, and the second prior decoding module obtains prior information from the prior stream, and the data decoding module decodes the data stream and continuously updates the decoded data based on prior and contextual information; and finally, it obtains the complete decoded data as the output of lossless decompression, and the object location refers to the pixel coordinate of the object in the image on the x-axis and y-axis, represented by four coordinate values defining a box on the image, and the object category refers to the semantic category label of the object in the image, represented by an enumeration noun, and the interaction relationship denotes a relationship between two objects in the image, represented by an N*N adjacency matrix for N objects, and the relation category refers to the category label of the relation between objects in the image, represented by an enumeration verb or orientation preposition;

wherein the data encoding module includes a first probability predictor and an entropy encoding module, and based on the prior information (output of the prior decoding module) and the context information (from the original data), the first probability predictor performs fusion and transformation operations and outputs a prior probability of the data to be encoded, and according to the predicted prior probability, the entropy encoding module can perform entropy coding and outputs a compressed data stream, and the data decoding module includes a second probability predictor and an entropy decoding module, and the second probability predictor shares parameters with the first probability predictor and performs the same fusion and transformation processing, and outputs the same prior probability of the data to be decoded based on the same prior information and context information from the decoded data, and the entropy decoding module performs entropy decoding and outputs each data after lossless decoding based on the input data stream and the prior probability;

the context-based graph convolutional lossless compression system improves for the compression and decompression of the data that are efficiently transferred in network and economically stored in the medium.

2. The context-based graph convolutional lossless compression system for scene graph data according to claim 1, in which the implicit information encoding module comprises: an encoding network as well as a quantization and coding module, wherein: the encoding network extracts an embedding vector of 2 channels from the scene graph data for later probability prediction, and the quantization and coding module rounds the prior information and then uses an entropy encoder to encode the rounded values into a prior stream.

3. The context-based graph convolutional lossless compression system for scene graph data according to claim 1, in which both the first and second prior information decoding modules include: a decoding and dequantization module and a decoding network, wherein: the decoding and dequantization model decodes the prior stream with an entropy decoder and converts the decoded integer data into floating-point data, and the decoding network transforms the floating-point data to obtain prior information of the original scene graph and decomposes it into prior information for object location, object category, interaction relationship, and relation category, and the encoding network and the decoding network both comprise a fully-connected neural network with four fully-connected layers and three ReLU layers.

4. The context-based graph convolutional lossless compression system for scene graph data according to claim 1, in which the probability predictor uses the existing scene graph data and calculates the information entropy as the loss function during training, and by decreasing the value of the loss function, the whole system is encouraged to reduce the length of the compressed bitstream so that the accuracy of the probability prediction can be automatically optimized; specifically:

$$\mathcal{L} = \frac{\sum_x \log_2 p(x)}{N},$$

where x is the data to be compressed, p(x) is the prior probability of x output by the probability predictor, and N is the normalizing value, which can denote the number of nodes in a scene graph, and the prior probability is the probability of the occurrence of an event predicted from previous experience, and according to Shannon's information entropy theory, the limit of the lossless compression rate of information is related to the uncertainty of information, and the more accurate the probability prediction of the information, the lower the lossless compression rate of the information and the better the compression effect therefore, in a lossless compression system, the prior probability needs to be estimated as accurately as possible to achieve the best compression rate.

5. The context-based graph convolutional lossless compression system for scene graph data according to claim 1, in which the probability predictors may include: a fusion network, a context-based graph convolutional network, and a directed graph context auto-encoder, and the fusion network includes a channel concatenating layer, a three-layer fully-connected neural network with three fully-connected layers, and two ReLU layers, and the channel concatenating layer concatenates the prior information with the graph contextual information extracted from the context-based graph convolutional network; it performs feature transformation through the fully-connected layers and ReLU layers, and the context-based graph convolutional network includes a context-based graph convolutional layer followed by two ReLU layers and fully-connected layers, and the context-based graph convolutional layer extracts the graph context information, and the following fully-connected layers and ReLU layers performs feature transformation, and the directed graph contextual auto-encoder combines context-based graph convolution with graph auto-encoder, effectively utilizing the interaction between decoded objects, and the directed graph contextual auto-encoder includes a transform network and context network; specifically, the transform network includes a four-layer fully-connected neural network with three ReLU layers, and the context-based graph convolutional network includes a context-based graph convolutional layer followed by two ReLU and fully-connected layers, and this module performs context feature extraction through the context-based graph convolutional layer and feature transformation through the fully-connected layers and ReLU layers.

6. A scene graph lossless compression method based on the context-based graph convolutional lossless compression system for scene graph data according to claim 1, in which the different implementations of the data encoding module and data decoding module are applied for different elements of data in the scene graph, regarding the object location data, the system uses a context-based graph convolutional network to extract contextual information from object location data; it uses a fusion network to combine the prior information to estimate the parameters of a generalized random distribution model; regarding the interaction relationships, aka the graph structure, it applies the directed graph context autoencoder to combine the contextual information from the graph structure in the form of an adjacency matrix with the prior information to estimate the parameters of a binomial discrete probability distribution model; for the relationship categories, the system utilizes the directed graph context autoencoder to estimate the parameters of a multinomial discrete probability distribution model, and specifically, the number of terms equals the number of relationship categories in the dataset; for the object categories, the system applies the context-based graph convolutional network and the fusion network to generate parameters of a multinomial discrete probability distribution model; similarly, the number of terms equals the number of relationship categories in the dataset, and the prior probabilities are obtained from all distribution models and are utilized to compress scene graph data losslessly with arithmetic coding to produce the final compression result.

7. The scene graph lossless compression method according to claim 6, in which the generalized random distribution model refers to a random distribution model defined as a neural network, which resembles a cumulative distribution function that satisfies a value domain of [0,1] and is monotonically non-decreasing, and the neural network parameters are obtained from the output of the fusion network and updated during network training.

8. The scene graph lossless compression method according to claim 6, in which the directed graph context autoencoder denotes a combination of graph autoencoder and context-based graph convolution; this module encodes the interaction relationship between the decoded nodes using the context-based graph convolution, and the encoded result is decoded by dot product with the prior information to estimate the interaction probability from the former nodes to the current node in the form of an adjacency matrix; in contrast, when calculating the interaction probability of the current node to former nodes, the context-based graph convolution ignores such message-passing flows, therefore, the contextual information of the decoded nodes cannot be used, and the prior probability can only be calculated from prior information.

9. The scene graph lossless compression method according to claim 6, in which the context-based graph convolution is a graph convolution operation in which the latter nodes are prevented from passing messages to the former, and in this way, it can ensure the contextual information are identical on both the encoder and decoder sides, and from the perspective of the graph adjacency matrix, the process can be simplified as setting the lower triangle part of the input adjacency matrix in the graph convolution to 0, expressed as $Z=D^{-1/2}triu(A)D^{-1/2}X\Theta$, where X is the input feature, Z is the output feature, $\Theta$ is the network parameter, triu(A) is the upper triangular part of the adjacency matrix, and D is the degree matrix of the upper triangular part of the adjacency matrix.

* * * * *